United States Patent [19]

Birchenough et al.

[11] Patent Number: 5,583,766

[45] Date of Patent: Dec. 10, 1996

[54] INTEGRATED ENGINE AND TRANSMISSION CONTROL SYSTEM

[75] Inventors: Charles W. Birchenough, Morton; Kenneth P. Liesener; Lorne W. Tweed, both of Peoria, all of Ill.

[73] Assignee: Caterpillar Inc., Peoria, Ill.

[21] Appl. No.: 350,773

[22] Filed: Dec. 7, 1994

[51] Int. Cl.$^6$ ................................................ B60K 41/08
[52] U.S. Cl. ............................ 364/424; 474/107; 474/109; 364/424.083
[58] Field of Search ...................... 364/424.1; 477/107, 477/109, 110, 111

[56] References Cited

U.S. PATENT DOCUMENTS

| | | | |
|---|---|---|---|
| 4,226,447 | 10/1980 | Brown | 285/316 |
| 4,355,550 | 10/1982 | Will et al. | 74/872 |
| 4,370,903 | 2/1983 | Stroh et al. | 74/858 |
| 4,403,527 | 9/1983 | Mohl et al. | 74/851 |
| 4,714,144 | 12/1987 | Speranza | 364/424.1 X |
| 4,766,544 | 8/1988 | Kurihara et al. | 364/424.1 |
| 4,817,776 | 4/1989 | Tateno et al. | 477/78 |
| 5,046,009 | 9/1991 | Abo et al. | 364/424.1 X |
| 5,125,292 | 6/1992 | Matsuoka et al. | 477/33 |
| 5,136,897 | 8/1992 | Boardman | 364/424.1 X |
| 5,272,632 | 12/1993 | Noguichi et al. | 364/424.1 |
| 5,323,667 | 6/1994 | Tweed et al. | 477/107 |
| 5,385,515 | 1/1965 | Chan et al. | 477/75 |
| 5,441,464 | 8/1995 | Markyvech | 477/109 |

*Primary Examiner*—Collin W. Park
*Attorney, Agent, or Firm*—R. Carl Wilbur; Steven G. Kibby

[57] ABSTRACT

A control system is provided for a vehicle regulating engine speed during shifts so as to reduce driveline torque and shift shock. The control system includes separate microprocessor based engine and transmission controllers which communicate via a data link. When a shift is initiated, the transmission controller delays a first period of time CTSDELAY sufficient for the transmission to disengage the old gear ratio and then produces a CTSSPEED signal. The transmission controller continues to produce the CTSSPEED signal for a second period of time CTSDUR which corresponds to the time required for the transmission to engage the new gear ratio. The engine controller receives the desired engine speed signal and regulates engine speed into correspondence with the desired speed. During upshifts, the CTSSPEED signal is set to a speed which is a predetermined amount above the synchronization speed of the new gear for an upshift. Conversely, during downshifts, the CTSSPEED is set to a speed which is a predetermined amount below the synchronization speed in the new gear. The control system preferably includes a unit [means] for sensing a lockup time period corresponding to the time required for the transmission to lock up in the new gear ratio. The control system is capable of modifying the second time period CTSDUR as a function of the sensed lockup time period.

22 Claims, 4 Drawing Sheets

INTEGRATED ENGINE AND TRANSMISSION CONTROL SYSTEM

TECHNICAL FIELD

This invention relates generally to an integrated engine and transmission controller and, more specifically, to a system which regulates engine speed during shifting to achieve improved shift characteristics.

BACKGROUND ART

Traditional automatic transmission controls shift gears according to preselected shift maps, e.g. at specified ground speeds, even if the engine is at full speed and full throttle. Gear shifts according to this method are inefficient and result in excessive wear to driveline components. More specifically, the transmission clutches must absorb kinetic energy generated by the engine during the gear changes. Such systems can exhibit excessive shift shock when the new gear is engaged due to the difference between the engine speed and the transmission speed in the new gear.

In view of these problems, vehicle manufacturers have developed control systems that are commonly referred to as integrated engine and transmission controllers. These systems function to reduce engine power during shifts to obtain satisfactory shift characteristics and increase the durability of the transmission clutches. Such systems generally reduce the engine speed during the shift by retarding ignition timing, reducing fuel injection or through a combination of both. Examples of integrated controllers are disclosed in U.S. Pat. Nos. 4,226,447; 4,355,550; 4,370,903; and 4,403,527.

Other types of integrated engine and transmission controllers are also known. For example U.S. Pat. No. 5,323,667 (hereafter "the '667 patent"), entitled "Integrated Engine and Transmission Control System" is directed towards providing an integrated engine and transmission controller which exhibits superior performance with respect to other known systems. It achieves that performance in part by regulating engine speed to a speed that is a predetermined amount above the synchronization speed in the new gear during upshifts. During downshifts, the control system regulates engine speed to a speed that is a predetermined amount below the synchronization speed in the new gear. The control holds that predetermined speed for a fixed, empirically determined time period that approximates the time required to engage the new gear.

The control system disclosed in the '667 was a significant improvement over prior controls. However, as can be appreciated, since the control regulates the engine speed for a fixed time that only approximates the actual time required to engage the new gear, there are instances where the approximation may be too long, resulting in reduced performance. Similarly, there may be instances where the approximation is too short, resulting in increased engine speeds prior to full engagement of the new gear, thereby subjecting the transmission to measured torques.

It would be preferable to have a control system that could measure the actual time required to accomplish a gear shift and thereafter modify the time period during which the control issues the engine speed command. The present invention is directed toward overcoming these and other problems associated with the prior art.

DISCLOSURE OF THE INVENTION

In accordance with one aspect of the present invention, a control system is provided for a vehicle having an engine connected to and adapted to drive an automatic transmission through a torque converter. The transmission includes a plurality of transmission gear ratios and an actuator automatically establishing a particular gear ratio in response to a transmission control signal. A transmission controller is adapted to sense at least one operating parameter and produce transmission control signals in response to the sensed parameter and in accordance with a predetermined shift map. The transmission controller is further adapted to produce a CTSSPEED signal a first time period CTSDELAY following initiation of the gear shift and continue to produce the CTSSPEED signal for a second time period CTSDUR which approximates the time period required to engage the new gear. The CTSSPEED signal corresponds to a speed which is a predetermined amount above the synchronization speed of the new gear for an upshift and a predetermined amount below the synchronization speed in the new gear for a downshift. An engine speed sensor is adapted to sense engine speed and produce an actual engine speed signal. An engine controller is adapted to receive an operator desired engine speed signal, the actual engine speed signal and the CTSSPEED signal. The engine controller calculates an error signal in response to a difference between the actual and desired speed signals when the CTSSPEED signal is not received, calculates an error signal in response to a difference between the CTSSPEED signal and the actual engine speed signal when the CTSSPEED signal is received, and regulates actual engine speed so as to reduce the error signal to zero. The control system is adapted to sense the completion of a gear shift and thereafter modify the second time period CTSDUR as a function of the sensed time required to complete the gear shift.

In accordance with a second aspect of the present invention, the transmission controller is adapted to set the CTSSPEED signal to a value which corresponds to engine idle and to set the second time period to a value which is greater than the second time period for automatic gear change during manual gear changes.

BEST MODE FOR CARRYING OUT THE INVENTION

Figure 1:
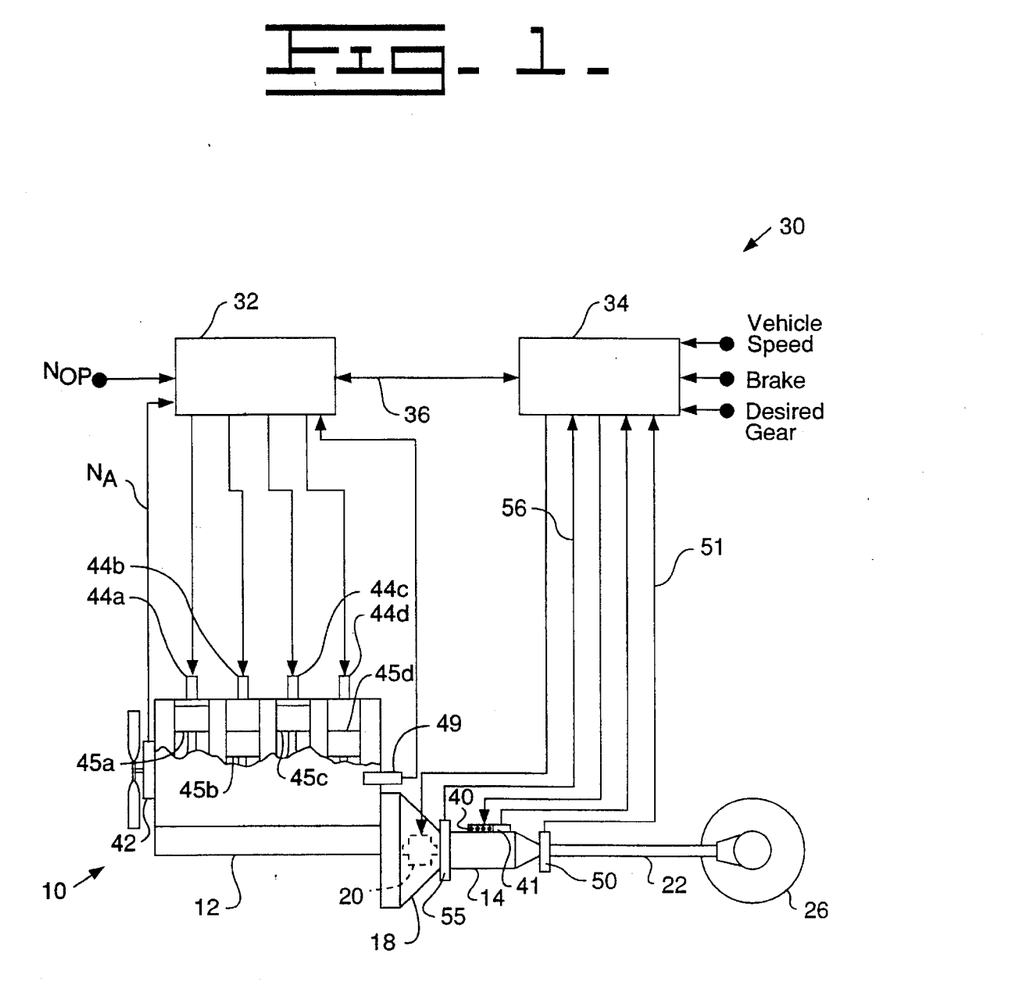
FIG. 1 is a schematic illustration of a vehicle control system incorporating an embodiment present invention.

Referring now to FIG. 1, a preferred embodiment of the present invention will be described. FIG. 1 is a schematic illustration of a vehicle power plant 10 to which the present invention can be applied. The power plant 10 is equipped with an engine 12 and an automatic transmission 14. The present invention was developed for a transmission having neutral, a plurality of forward gear ratios and a reverse gear ratio; however, it can readily be adapted to different transmission configurations, as would be apparent to one skilled in the art. The input of the transmission 14 is connected to and driven by the engine 12 through a torque converter 18 equipped with a lockup clutch 20. A transmission input speed sensor 55 is connected to the transmission 14 and produces a transmission input speed signal that is a function of the transmission input speed. The transmission input speed signal is delivered to a transmission controller 34 over electrical conductor 56. The output of the transmission 14 is connected to and adapted to rotatably drive a shaft 22. A transmission output speed sensor 50 is connected to the transmission 14 and produces a transmission output speed signal that is a function of the transmission output speed. The transmission output speed signal is delivered to the transmission controller 34 on electrical conductor 51. The shaft 22 is in turn connected to and adapted to drive a ground engaging wheel 26, thereby propelling the vehicle. In this manner, engine torque or power is transmitted to the wheel 26 with a predetermined speed ratio.

A vehicle control system 30 includes engine and transmission controllers 32,34 which are embodied in separate microprocessors adapted to communicate via a data link 36. Numerous commercially available microprocessors can be adapted to perform the functions of the engine and transmission controllers. Applicant has developed the present invention using series MC68HC11 microprocessors as manufactured by Motorola, Inc. of Schaumburg, Ill. It should be appreciated that both controllers could readily be embodied in a single microprocessor without departing from the scope of the present invention.

The transmission controller 34 is adapted to receive inputs including a vehicle speed signal, and effect gear changes in the transmission 14 in response to the received signals and in accordance with a predetermined shifting strategy, as is common in the art. For this purpose, the transmission 14 is provided with upshift and downshift solenoids 40. The controller 34 selectively delivers control signals to these solenoids to initiate gear change operations. Actuation of one of the shift solenoids 40 displaces a rotary selector valve (not shown) to a position corresponding to the new gear. When the selector valve is repositioned in this manner, the transmission automatically disengages the old gear and engages the new gear, as is common in the art. The transmission controller 34 is also electrically connected to the lockup clutch 20 for controlling its engagement and disengagement during shifting in accordance with a preselected strategy as explained below.

A gear selector (not shown) is provided for indicating a desired transmission gear ratio and direction of travel. It should be appreciated that the gear selector can be embodied in any device or combination of devices capable of providing an electrical signal for indicating a desired gear ratio and direction of travel. For example, the gear selector can be in the form of movable lever having a neutral position and a plurality of forward gear positions and reverse position. A sensor (not shown), such as a switch or potentiometer, is adapted to sense the position of the gear selector and produce a desired gear signal responsive to the selector's position. The desired gear signal is supplied to the transmission controller 34, as indicated in FIG. 1. As vehicle speed increases, the transmission controller 34 effects gear shifting in accordance with the preset shift map until the desired gear is reached.

An actual gear sensor 41 is provided for sensing the actual transmission gear ratio and producing an actual gear ratio signal. Preferably, the sensor 41 is in the form of a combination of switches which produce a unique code for each transmission gear ratio as would be appreciated by one skilled in the art. The transmission controller 34 has an input adapted to receive the actual gear ratio signal.

Additionally, the transmission controller 34 receives a braking signal from brake sensor (not shown) which indicates if a braking operation is being performed. This sensor can be embodied in any device, such as a switch, which is capable of producing an electrical signal for indicating that a braking operation is being performed. In the present invention, the braking signal is produced whenever the vehicle brakes, retarder brake or parking brakes are active.

The engine controller 32 is adapted to receive operating parameters including an operator desired speed signal $N_{OP}$ and an actual engine speed signal $N_A$ and responsively regulate engine speed in a closed-loop control. For this purpose, the control system includes a pedal position sensor (not shown) which is adapted to produce an electrical signal responsive to the position of the vehicle's accelerator pedal (not shown). One suitable position sensor for performing this function is disclosed in U.S. Pat. No. 4,915,075 which issued to Brown on Mar. 20, 1989. Additionally, the control system includes an engine speed sensor 42 which is adapted to sense engine speed and produce an engine speed signal. Preferably, the engine speed sensor 42 is in the form of a magnetic pick-up sensor adapted to produce a signal corresponding to the rotational speed of the engine 12. One suitable sensor is described in U.S. Pat. No. 4,972,332 which issued to Luebbering et al. on Nov. 20, 1990. The sensor disclosed therein is capable of determining the speed, angular position and direction of rotation of a rotatable shaft. The control system 10 also includes an engine temperature sensor 49 which is connected to the engine and produces an engine temperature signal.

The engine controller 32 processes the received signals to produce a fuel injection control signal $I_{fuel}$ for regulating the fuel delivery to the engine in response to a difference (i.e., error) between a desired engine speed signal and the actual engine speed signal and in accordance with a horsepower map (not shown) as is common in the art. Normally, the actual engine speed signal is equal to the operator desired speed signal. Preferably, actual engine speed is regulated into correspondence with the desired engine speed using a proportional-integral-differential (PID) control loop. While a PID loop is preferred, it should be appreciated that the present invention could readily be adapted for use with other control strategies such as a proportional-integral control.

The injection control signal is delivered to solenoid operated fuel injector units 44a–d associated with individual engine cylinders 45a–d (four shown for illustration purposes) of the engine 12. The duration of the injection control signal corresponds to the on-time of the solenoid, thereby controlling the duration for which the injector delivers 44 fuel to associated cylinder 45 during the combustion cycle. Solenoid operated fuel injectors of this type are well known in the art and it is perceived than any of them can be used with the present invention. One suitable solenoid operated fuel injector is shown in U.S. Pat. No. 4,219,154 which issued Aug. 26, 1980 to Douglas A. Luscomb. It discloses a solenoid controlled, hydraulically actuated unit injector. Another suitable solenoid is shown in U.S. Pat. No. 4,653, 455, issued Mar. 31, 1987 to Eblen et al. It discloses a solenoid controlled, mechanically actuated unit injector.

As was stated above, the engine speed is normally controlled in response to the operator desired speed signal $N_{OP}$. However, during gear changes engine speed is regulated in response to a desired engine speed signal produced by the transmission controller 34 and in accordance with a preselected strategy which is referred to as Adaptive Controlled Throttle Shifting (ACTS). The ACTS strategy limits engine speed during shifting so as to reduce the driveline torques and clutch thermal loads developed during shifting. In prior systems of this type, the engine speed has typically been regulated to idle speed or the synchronization speed in the next gear. It was found that both of these control strategies can lead to unacceptable hesitation and decreased acceleration performance during the shift. Furthermore, other systems typically regulate the engine speed for a predetermined fixed period of time that approximates the time period required to make the shift. That approximation may not be accurate for particular transmissions and over the entire life of the transmission and thus may cause brief periods where engine speed may subject the transmission to increased torques.

Controlling engine speed to idle is undesirable because when the transmission reengages, the engine speed can be slower than the transmission input speed. This speed differential will cause vehicle deceleration due to engine braking. Depending on the duration of the deceleration period, the operator will feel this as either a rough shift or a shift with unacceptable acceleration.

For a similar reason, it has been found that controlling directly to synchronous speed is undesirable in vehicles equipped with torque converters. More specifically, torque converters do not transmit any torque unless there is a speed differential between its input speed (i.e., engine speed) and output speed (i.e., transmission input speed). During shifts, the lockup clutch is disengaged and, hence, no torque will be transmitted to the transmission unless there is a speed differential across the torque converter. Therefore, if engine speed is controlled to synchronous speed the torque available at the transmission input will be effectively zero at the end of the shift. This torque interruption will be perceived by the operator as a hesitation during the shift and will result in less than optimal acceleration performance.

In response to these problems, the subject control regulates engine speed to a speed which is a predetermined amount above the synchronization speed in the new gear during upshifts. Similarly, during downshifts the subject control regulates engine speed to a speed which is a predetermined amount below the synchronization speed in the new gear. In applicant's system, the engine speed is controlled to approximately 150 rpm above and below the synchronization speed during upshifts and downshifts, respectively. This offset was empirically determined to minimize the stress on the driveline components without resulting in unacceptable shift hesitation and torque interruption. This offset is dependent on the performance characteristics of the torque converter, engine and transmission. Furthermore, the present control system can adaptively change the time period during which the control will regulate the engine speed in response to an actual measurement of the time required to complete a shift. In this manner, engine speed control can be returned to the operator as soon as possible, without subjecting the transmission to excessive loads during shifting.

In order to implement the ACTS strategy, the transmission controller 34 includes an ACTS map stored in its memory. For each gear change, the ACTS map provides an ACTS time delay (CTSDELAY), an ACTS desired engine speed (CTSSPEED), and an initial ACTS duration (CTSDUR). CTSSPEED corresponds to the desired speed that the engine controller 32 uses during the shift. As shown on the timeline of FIG. 2, CTSDELAY corresponds to a time delay between the start of a shift and the time at which the engine controller 32 is to start regulating the engine to CTSSPEED. This time is empirically determined and approximates the time required for the transmission to disengage the old gear. The CTSDUR time period corresponds to the time period that the engine controller 32 regulates engine speed to the CTSSPEED. This duration is initially empirically determined and approximates the time required to engage the new gear. As will be explained below, one aspect of the present ACTS control strategy permits the CTSDUR time period to change adaptively over time. Thus, as the transmission 14 operating conditions change over the life of the vehicle, the initial CTSDUR value may increase to reflect the increased time required to complete a gear change in the older transmission. The above ACTS values are transmitted to the engine controller 32 via the data link 36 at the start of a shift.

When ACTS data is received, the engine controller 32 sets a delay timer equal to CTSDELAY. When this timer times out, the desired engine speed is set to CTSSPEED. The engine controller 32 regulates engine speed to CTSSPEED for a time equal to CTSDUR. After this time elapses, control of engine speed is returned to the accelerator pedal. Preferably, control is returned to the accelerator pedal in a ramped or step-wise fashion to prevent abrupt changes in engine speed.

Referring again to FIG. 2, a typical shift sequence will be explained in more detail. At time $T_0$, the transmission controller 34 determines that a shift is needed based on a predetermined shift strategy, e.g. based on vehicle speed in the current gear. At this time, the vehicle is in lockup drive or direct drive, wherein the lockup clutch 20 is engaged such that the transmission 14 is directly driven by the engine 12. Conversely, during gear changes the vehicle operates in torque converter drive, wherein the lockup clutch 20 disengages and the engine 12 drives the transmission 14 through the torque converter 18. When the transmission controller 34 determines a shift is required, it simultaneously transmits the ACTS data over the communications link 36 and initiates the gear change operation by disengaging the old gear and the lockup clutch 20. Disengagement is not instantaneous because of the delays associated with the hydraulics in the transmission 14. However, by time $T_1$, both the lockup clutch 20 and the old gear are assumed to be disengaged.

Figure 2:
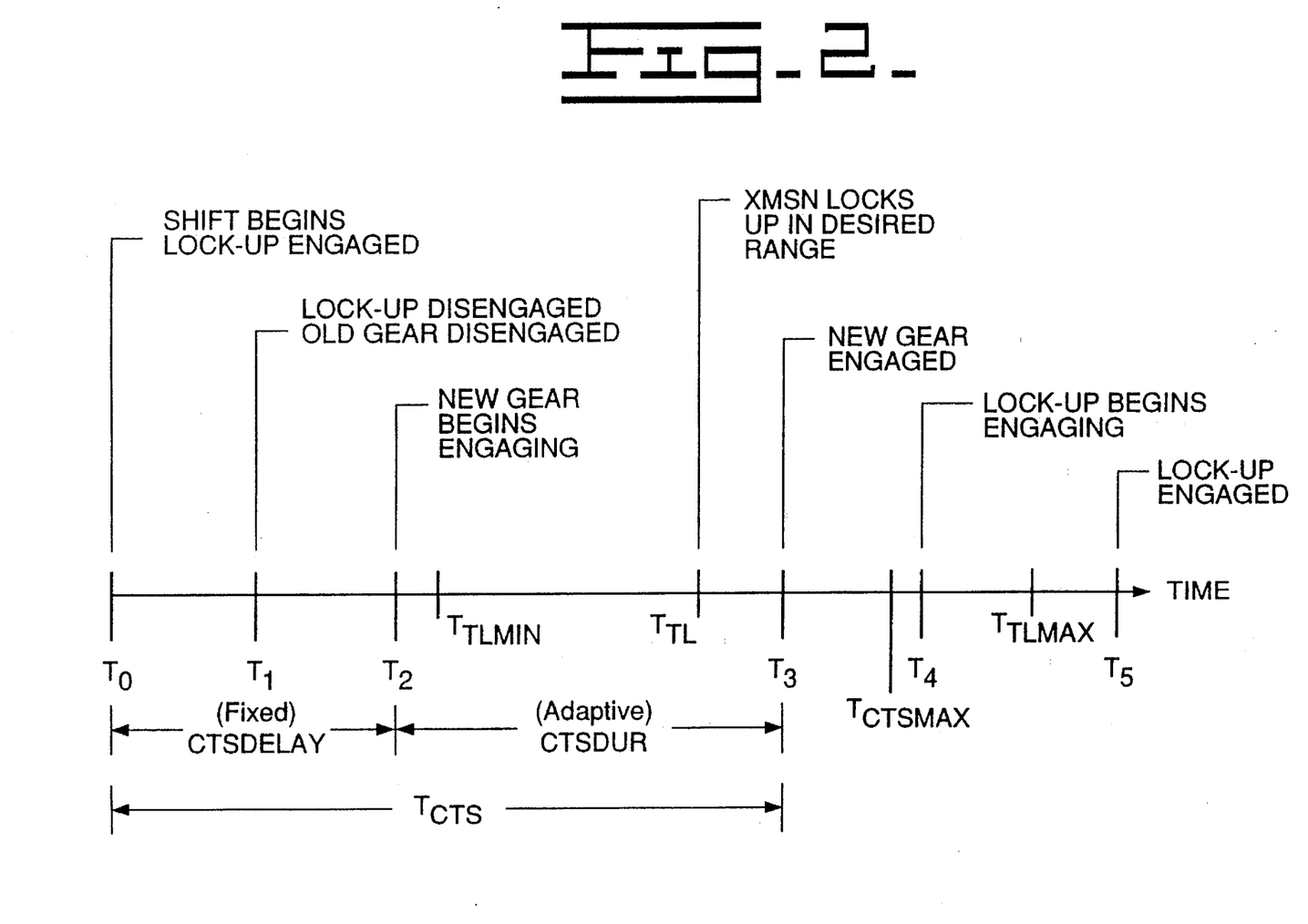
FIG. 2 is a timeline illustrating a typical shift in accordance with an aspect of present invention.

Subsequently, at time $T_2$ the new gear begins engagement. The time between $T_0$ and $T_2$ is measured under lab conditions to determine the approximate time delay between the initiation of a gear shift operation and the time at which the new gear begins engagement. From these measurements, a CTSDELAY is determined for each gear change operation. Hence, at approximately the same time the new transmission gear begins engagement, the engine controller 24 starts to regulate the engine speed to CTSSPEED.

The engine speed is regulated to CTSSPEED for a period of time equal to CTSDUR. Initially, CTSDUR is an empirically determined approximation of the time required for the new gear to engage completely. Hence, when CTSDUR expires at time $T_3$ the new transmission gear is assumed to be engaged. At that point, engine speed is regulated by the operator desired speed $N_{OP}$ as indicated by the accelerator pedal. At time $T_4$, the lockup clutch 20 begins engagement. Subsequently, at time $T_5$, the lockup clutch 20 engages and the vehicle is returned to direct drive.

As previously mentioned, the ACTS control adaptively changes the value of CTSDUR. The ACTS control performs this function by measuring when the gear is actually engaged. The ACTS control measures the time required for gear engagement by monitoring both the transmission input speed signal and the transmission output speed signal on electrical conductors 56, 51. By knowing the selected gear, the control can verify that the transmission 14 is in the new gear when the ratio of the input speed to the output speed is within a predetermined tolerance of the new gear ratio. Thus, an embodiment of present invention calculates a $T_{tt}$ signal, which is defined as the time between the beginning of the shift $T_0$ and the measured engagement of the new gear. An embodiment of the present invention then modifies the initial empirically determined approximation of CTSDUR by a function of $T_{tl}$.

As shown in FIG. 2, the combined time period of the CTSDELAY and the CTSDUR is referred to as the ACTS control period, $T_{cts}$. Also shown in FIG. 2 is a predetermined maximum time value $T_{tlmax}$ and a predetermined measuring time value $T_{tlmin}$. As will be explained more fully below, these values establish maximum and minimum values for $T_{tl}$ so that the adaptive control does not modify the CTSDUR signal with values above or below those values. Also shown is a $T_{ctsmax}$ which represents a maximum value for the ACTS control period $T_{cts}$. Each of these limiting parameters are explained more fully below.

Figure 3A:
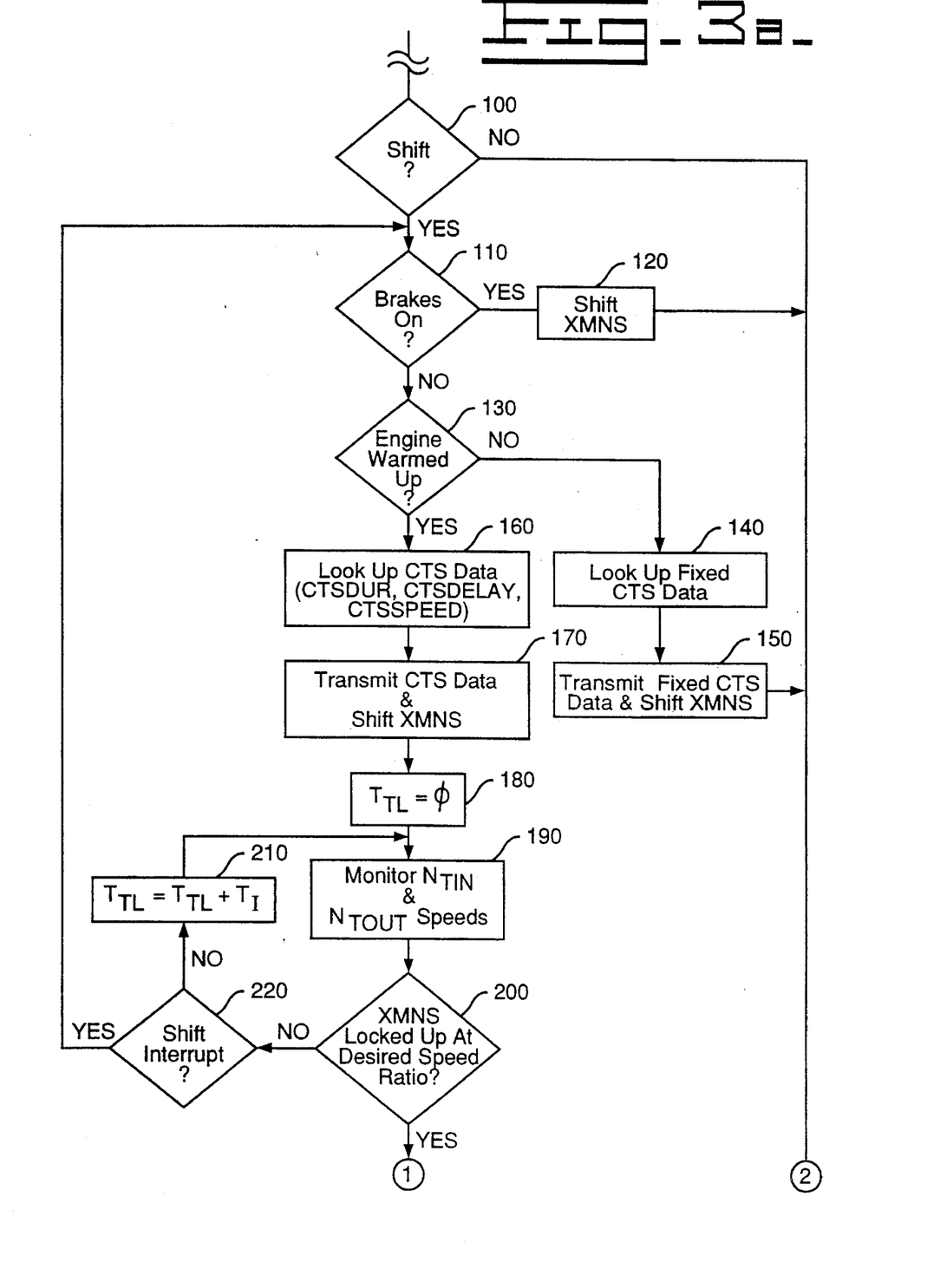
FIGS. 3a–3b are software flowcharts for practicing certain aspects of the present invention.
Figure 3B:
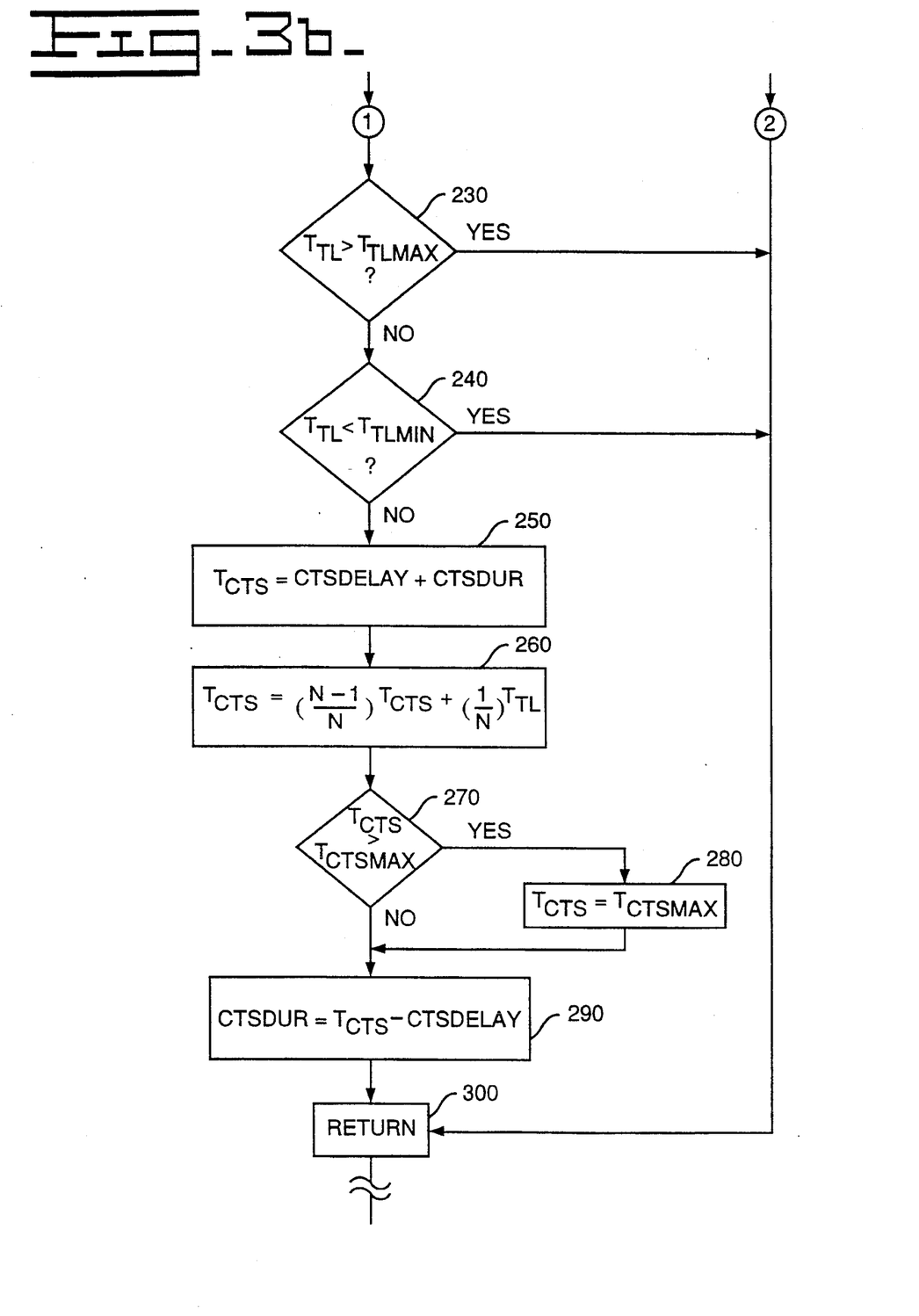

Referring now to FIGS. 3a and 3b, an embodiment of the software for programming the controllers 32,34 in accordance with certain aspects of the present invention is explained. FIGS. 3a and 3b are flowcharts illustrating a computer software program for implementing a preferred embodiment of the present invention. The program depicted in this flowchart is particularly well adapted for use with the MC68HC11 microprocessor and associated components described above, although any suitable microprocessor may be utilized in practicing an embodiment of the present invention. The software program may be readily coded from these detailed flowcharts using the instruction set associated with this system, or may be coded with the instructions of any other suitable conventional microprocessors. The process of writing software code from flowcharts such as these is a mere mechanical step for one skilled in the art.

Referring first to FIG. 3a, in the block 100, the transmission controller 34 determines if a shift operation should be made based on the shift control map stored in memory. If no shift is required, control is passed to block 300 where it returns to the main program. If a shift operation is required, software control passes to block 110. In block 110, the controller 34 samples the brake sensor to determine if the vehicle's brakes are in operation. If a braking operation is detected, the control passes to block 120 where the shift is performed without employing an ACTS strategy of the present invention. Control then passes to block 300 and is returned to the main program. In contrast, if no braking operation is detected, control passes to block 130.

In block 130, the transmission controller 34 determines whether the engine has been warmed up. The engine controller determines this by reading the engine temperature signal produced by the engine temperature sensor 49. If the engine temperature signal exceeds a predetermined level, then the engine has warmed up. If the engine is not warmed up, then software control passes to block 140. In block 140, the transmission controller 34 retrieves the fixed ACTS data for the gear change which is to occur. More specifically, the controller 34 retrieves the values of CTSDELAY, CTSSPEED and an initial CTSDUR value for the current shift. Control then passes to block 150 where the transmission controller transmits the ACTS data to the engine controller 32 over the data link 36. The decisional software block 130 causes the ACTS control 30 to use fixed ACTS data when the engine is not warmed up. By using fixed ACTS data, the ACTS control circumvents the adaptive portion of the control and thereby helps insure that the control does not erroneously modify the CTSDUR value with a value measured when the transmission and the engine are cold. From block 150, software control passes to block 300 and returns to the main program.

If the engine controller 32 determines that the engine is warmed up, by reading an engine temperature signal from the engine temperature sensor 49 that is greater than the predetermined value, then software control passes from block 130 to block 160.

In block 160, the transmission controller 34 looks up the ACTS data. Software control passes to block 170 where the transmission controller 34 transmits the ACTS data to the engine controller 32 over the data link 36.

In an embodiment of the present invention, the adaptive portion of the ACTS controller 30 modifies the CTSDUR value as a function of the sensed time period $T_{tl}$ required to complete a shift for a particular gear. Block 180 begins the adaptive portion of the ACTS strategy, which in a preferred embodiment, modifies the CTSDUR according to the following formula:

$$T_{cts}(n+1) = \left(\frac{N-1}{N}\right) T_{cts}(n) + \left(\frac{1}{N}\right) T_{tl};$$

and $$CTSDUR = T_{cts}(n+1) - CTSDELAY$$

where $T_{tl}$ is the time between the start of a shift and transmission lockup $T_i$ is the incremental timer value for advancing the $T_{tl}$ value $T_{cts}$ is the ACTS control period and is the sum of the CTSDELAY and the adaptive CTSDUR value.

In block 180 the ACTS control 30 sets the $T_{tl}$ value to zero. Software control then passes to block 190 where the transmission controller monitors the transmission input speed on electrical conductor 56 and the transmission output speed on electrical conductor 51. Software control then passes to block 200.

In block 200, the transmission controller 34 calculates the ratio of the transmission input speed to the transmission output speed, each of which where measured in block 190. The transmission controller 34 compares that ratio to the new gear ratio to determine whether the transmission has locked up. If the transmission has not locked up then control passes to block 220.

In block 220 the transmission determines whether there has been an interrupt in the shift. An interrupt might be caused manually by the operator or by an operating condition that is sensed by the transmission controller 34 or the engine controller 32. If there is an interrupt, then software control passes to block 110 where the ACTS control sequence is repeated. If there is no interrupt then control passes to block 210 where the transmission controller increments the elapsed time variable $T_{tl}$ by the incremental timer value $T_i$. Control then passes from block 210 to block 190.

In block 200, once the transmission controller 34 determines that the transmission has locked up control passes to block 230. In block 230 and block 240, the transmission controller 34 compares the elapsed time for the lockup $T_{tl}$ (i.e. the time from $T_0$ until actual lockup) to a predetermined maximum value $T_{tlmax}$ and to a predetermined minimum value $T_{tlmin}$. If the actual elapsed time $T_{tl}$ exceeds $T_{tlmax}$ then the measured elapsed time $T_{tl}$ is not used to adjust CTSDUR adaptively. Control passes from block 230 to block 300 and returns to the main program. Likewise, if the measured elapsed time $T_{tl}$ is less than $T_{tlmin}$ then the measured elapsed time $T_{tl}$ is not used to adjust CTSDUR adaptively. Control passes from block 240 to block 300 and returns to the main program. These control blocks 230,240 filter out erroneous readings and other readings that might unduly skew the adaptive calculation described below.

If, on the other hand, the measured elapsed time $T_{tl}$ is between $T_{tlmax}$ and $T_{tlmin}$, then control passes to block 250. In blocks 250 through 290, the ACTS control strategy adaptively modifies the CTSDUR value according to the formula given above. In block 250, the transmission controller calculates a $T_{cts}$ value as the sum of the fixed CTSDELAY and the CTSDUR values. Control then passes to block 260 where a new $T_{cts}$ value is calculated as a function of the prior $T_{cts}$ value, the measured elapsed time $T_{tl}$ and an averaging time constant N. In a preferred embodiment, the averaging time constant is set at 100. However, as would be appreciated by those skilled in the art, the averaging time constant N could be readily and easily set to other values without deviating from the spirit and scope of the present invention as defined by the appended claims. Once the transmission controller 34 calculates the $T_{cts}$ value, control passes to block 270.

In block 270, the $T_{cts}$ value calculated in block 260 is compared to a maximum value $T_{ctsmax}$. If the calculated $T_{cts}$ value is greater than $T_{ctsmax}$, then software control passes to block 280 where the transmission controller 34 sets the $T_{cts}$ value to the $T_{ctsmax}$. Software control then passes to block 290. In block 270, if the calculated $T_{cts}$ value is not greater than $T_{ctsmax}$, then control passes to block 290.

In block 290, the ACTS control strategy adaptively modifies the CTSDUR value. The CTSDUR value is set to the difference between the newly calculated $T_{cts}$ and the fixed CTSDELAY. This new CTSDUR is then used as the future time period in which the engine controller will use the CTSSPEED value as the engine speed command. Control then passes from block 290 to block 300 and returns to the main program.

The present invention permits the ACTS control 30 to modify the CTSDUR time period adaptively. The CTSDUR value is then used by the engine controller 32 as the time period over which the CTSSPEED engine speed command overrides the operator desired engine speed command $N_{OP}$. In this manner, an embodiment of the present invention can increase (or decrease) the CTSDUR time period to account for wear, or other variables that may effect shifting performance, over the life of the vehicle.

Other aspects, objects and advantages of this invention can be obtained from a study of the drawings, disclosure and the appended claims.

We claim:

1. A control system for a vehicle having an engine connected to and adapted to drive an automatic transmission through a torque converter, the transmission including a plurality of transmission gear ratios and a means for automatically establishing a particular gear ratio in response to a transmission control signal, comprising:

a transmission controller adapted to produce transmission control signals in response to at least one sensed operating parameter in accordance with a predetermined shift map, and to produce a CTSSPEED signal during a change from an old gear ratio to a new gear ratio, the CTSSPEED signal corresponding to a speed which is a first predetermined amount above the synchronization speed of the new gear for an upshift and a second predetermined amount below the synchronization speed of the new gear for a downshift;

an engine speed sensor adapted to sense engine speed and produce an actual engine speed signal;

means for producing an operator desired engine speed signal;

an engine controller adapted to receive the operator desired engine speed, actual engine speed and the CTSSPEED signals, calculate an error signal in response to a difference between the actual and desired speed signals when the CTSSPEED signal is not received, calculate an error signal in response to a difference between the CTSSPEED signal and the actual engine speed signal when the CTSSPEED signal is received, and regulate actual engine speed so as to reduce the error signal to zero;

wherein the transmission controller begins production of the CTSSPEED signal after a first time period CTSDELAY following initiation of the gear change operation and thereafter continues to produce the CTSSPEED signal for a second time period CTSDUR, the first time period CTSDELAY corresponding to time required for the transmission to disengage the old gear ratio and the second time period CTSDUR corresponding to the time required for the transmission to engage the new gear ratio; said transmission controller determining a lockup time period $T_{tl}$ corresponding to the time between initiating a gear shift and engagement of the new gear ratio, and modifying said second time period CTSDUR as a function of said lockup time period.

2. A control system as set forth in claim 1, further comprising:

a transmission input speed sensor;

a transmission output speed sensor;

said transmission controller receiving signals from said transmission input speed sensor and said transmission output speed sensor, and responsively determining said lockup time period based upon the ratio of said transmission input speed to said transmission output speed.

3. A control system as set forth in claim 2, further comprising an engine temperature sensor that produces an engine temperature signal, said transmission controller modifying said second time period CTSDUR only when said engine temperature signal is greater than a predetermined value.

4. A control system as set forth in claim 3, wherein said second time period CTSDUR is modified according to the following formula:

$$CTSDUR \text{ (new)} = \frac{(n-1)}{n} (CTSDUR) + \frac{1}{n} (T_{tl} - CTSDELAY)$$

where n is a weighting average.

5. A control system as set forth in claim 1 wherein the engine controller produces a fuel injection signal in response to the error signal.

6. A control system as set forth in claim 1, wherein the engine and transmission controllers are embodied in separate microprocessors.

7. A control system as set forth in claim 1, wherein the operating parameter is responsive to vehicle speed.

8. A control system as set forth in claim 1, further including means for manually changing the transmission gear ratio, and wherein during preselected manual gear changes the transmission controller is adapted to set the CTSSPEED signal to a value which is lower than the CTSSPEED for an automatic gear change.

9. A control system as set forth in claim 8, wherein during the preselected manual gear changes the CTSSPEED signal is set to a value which corresponds to engine idle speed.

10. A control system as set forth in claim 8, wherein during the preselected manual gear changes the transmission controller is adapted to set the second time period to a value which is greater than the second time period for an automatic gear change.

11. A control system as set forth in claim 10, wherein the values of the CTSSPEED signal and second time duration are only modified if engine speed is above a preselected value at the initiation of the manual shift.

12. A control system as set forth in claim 11, wherein the values of the CTSSPEED signal and the second time duration are only modified during directional changes or shifts out of neutral.

13. A control system for a vehicle having an engine connected to and adapted to drive an automatic transmission through a torque converter, the transmission including a plurality of transmission gear ratios and a means for automatically establishing a particular gear ratio in response to a transmission control signal, comprising:

a first microprocessor-based controller adapted to produce transmission control signals in response to at least one sensed operating parameter in accordance with a predetermined shift map, and produce a CTSSPEED signal after a first time period CTSDELAY following initiation of a gear change operation and thereafter continue production of the CTSSPEED signal for a second time period CTSDUR, the CTSSPEED signal corresponding to a speed which is a first predetermined amount above the synchronization speed of the new gear for an upshift and a second predetermined amount below the synchronization speed in the new gear for a downshift, the first time period CTSDELAY corresponding to a time required for the transmission to disengage the old gear ratio and the second time period CTSDUR corresponding to the time required for the transmission to engage the new gear ratio, the first controller determining a transmission lockup time in the new gear ratio and modifying said second time period CTSDUR as a function of said lockup time period;

an engine speed sensor adapted to sense engine speed and produce an actual engine speed signal;

means for producing an operator desired engine speed signal;

a second microprocessor-based controller adapted to receive the operator desired engine speed, actual engine speed, and the CTSSPEED signals, calculate an error signal in response to a difference between the actual and desired speed signals when the CTSSPEED signal is not received, calculate an error signal in response to a difference between the CTSSPEED signal and the actual engine speed signal when the CTSSPEED signal is received, and regulate engine speed so as to reduce the error signal.

14. A control system as set forth in claim 13 wherein the second controller produces a fuel injection signal in response to the error signal.

15. A control system as set forth in claim 14, further including means for manually changing the transmission gear ratio and wherein during preselected manual gear changes the first microprocessor-based controller is adapted to set the CTSSPEED signal to a value which corresponds to engine idle and to set the second time period CTSDUR to a value which is greater than the second time period CTSDUR for an automatic gear change.

16. A method of effecting shifts in a vehicle having an engine connected to and adapted to drive an automatic transmission through a torque converter, the transmission including a plurality of transmission gear ratios and a transmission actuator for automatically establishing a particular gear ratio in response to a transmission control signal, comprising the steps of:

sensing when a gear change is required and determining a first time period CTSDELAY, a second time period CTSDUR and a engine control speed CTSSPEED, the first time period CTSDELAY corresponding to a first previously determined time required for the transmission to disengage the old gear ratio, the second time period CTSDUR corresponding to a second previously determined time required for the transmission to engage the new gear ratio and the engine regulation speed CTSSPEED corresponding to a speed which is a first predetermined amount above the synchronization speed of the new gear for an upshift and a second predetermined amount below the synchronization speed of the new gear for a downshift;

initiating the gear change operation;

determining when a time equal to the first time period CTSDELAY has elapsed since the gear change was initiated and thereafter regulating engine speed into correspondence with the engine regulation speed for a period of time equal to the second time period CTSDUR;

thereafter controlling engine speed in accordance with an operator selected engine speed until another gear change is required;

determining a lockup time period $t_{ll}$ corresponding to the time between disengagement of the old gear ratio and the time when the transmission locks up in the new gear ratio in response to at least one sensed operating parameter; and modifying said second time period CTSDUR as a function of said lockup time period.

17. A method as set forth in claim 16, wherein said at least one sensed operating parameter is a function of vehicle speed.

18. A method as set forth in claim 16, wherein during preselected manual gear changes the engine regulation speed is set to a value which is lower than the engine regulation speed for an automatic gear change.

19. A method as set forth in claim 18, wherein during preselected manual gear changes the second time period is set to a value which is longer than the second time period for automatic gear change.

20. A method as set forth in claim 19, wherein during preselected manual gear changes the engine regulation speed corresponds to engine idle speed.

21. A method as set forth in claim 20, wherein the values of the engine regulation speed and second time duration are modified if actual engine speed is above a preselected value at the initiation of the manual shift.

22. A method as set forth in claim 21, wherein the values of the engine regulation speed and second time duration are modified during directional changes or shifts out of neutral.

* * * * *